Nov. 8, 1966  W. GROBE  3,284,745

CYLINDRICAL ELECTRO-MAGNET

Filed Dec. 29, 1964  2 Sheets-Sheet 1

United States Patent Office 3,284,745
Patented Nov. 8, 1966

3,284,745
CYLINDRICAL ELECTRO-MAGNET
Wolfgang Grobe, Ludwigsburg, Germany, assignor to International Standard Electric Corporation, New York, N.Y., a corporation of Delaware
Filed Dec. 29, 1964, Ser. No. 421,915
Claims priority, application Germany, Jan. 11, 1964, St 21,547
10 Claims. (Cl. 335—213)

The invention relates to cylindrical magnets and particularly to cylindrical magnets having excitation windings providing magnetic fields in radial and/or circular directions.

Of interest are hollow cylindrical magnets which show a small axial extension compared to the diameter of the cylinder and which are conventionally designated as toroidal magnets. Such cylindrical magnets without an air gap are used, for example, in relays in which the magnetizing direction of a permanent magnet influencing the armature when changing from a position of rest to an operative position or vice versa is turned by approximately a right angle. Such magnetic bodies, for example, have two perpendicular magnetizing directions of which at least one direction has a stable character and can be set by suitable excitation. For the effective force on the armature only one of the two flux directions is generally used.

In the present invention, the axially directed flux is considered as useful flux. The course of the flux perpendicular to the useful flux is then of importance only in that it should have no component in the direction of the useful flux. At an axially directed useful flux it is sufficient that the non-operative flux runs in a plane perpendicular to the axis of the cylinder. Therefore, the radial direction of this flux must be considered, besides the circular direction.

While the axially directed magnetic flux can in any case be generated in a simple manner by a winding concentrically applied on the cylinder core; the excitation of a magnetic flux oriented transverse to said axis, and particularly a circular magnetic flux, requires winding shapes which are essentially more difficult to manufacture. For example, the known toroidal windings require rather complicated and consequently expensive winding facilities when using such windings with toroidal cores having a favorable form, e.g. a cross-section compact in the axial direction. Still more difficult is the production of windings for cylindrical cores which have a large extension in the axial direction compared with the clear internal diameter.

In conjunction herewith it is an object of the invention to create a cylindrical magnet with excitation windings for circular and/or radial magnetizing direction, the construction of which avoids the aforementioned difficulties in production. The problem is solved, according to the invention, in that a cylindrical core with one or several conductor loops is used and primarily consists in that the cross-section surface through which always one conductor loop passes, is essentially located in an imaginary cylindrical hull surface, passing coaxially through the magnet. Such a winding is simple and, consequently, economical to produce, permitting the provision of circular as well as radial magnetic flux.

A particularly favorable manufacture, having a field line course very advantageous for many cases of application, results in compliance with a special design of the invention in that several conductor loops are series-connected and arranged side by side meander-like in the circumference of the cylinder. When such a winding is embedded all around by the magnetic body, each loop section produces for itself a circular magnetic flux of a small dimension. The course of the field lines within the cylindrical core therefore consists of oppositely directed magnetization, in the radial direction as well as in circular direction in the circumference of succeeding sections of the core. Within the entire magnet therefore no resulting circular magnetic flux is built up. It is also advantageous, however, to use the winding to provide to the axially directed useful flux a perpendicular non-operative flux component.

Regarding the manufacture of particularly advantageous constructions of the magnet according to the invention are the meander-like recess to accommodate the conductor of the excitation winding along the circumference of the cylinder core. Moreover, the meander-like recess of the cylinder core can have a depth exceeding the diameter of the conductor and said additional depth filled by a magnetic body matching the meander-shape. The conductor loops of the meander winding in the longitudinal direction of the cylinder may also be straight and only be connected with the cylindrical core along their longitudinal sides.

Presuming such a winding shape, a magnet can be obtained which is particularly favorable to manufacture in that the cylindrical core consists of a plurality of rod-shaped magnetic bodies which are arranged side by side to form cylindrical walls and which show a longitudinal recess to accommodate one loop side of the excitation winding.

The rod-shaped magnetic bodies can at first be applied on a straight conductor, whereupon the conductor is deformed until a mutual touching of the magnetic bodies along their longitudinal sides is obtained and then made cylindrically. The magnet thus obtained can be embedded in a suitable supporting body, for example, by molding.

The invention can be extended in that the rod-shaped magnetic bodies may be made by sectional pressing of the conductor with a magnetic mass being in a plastic condition and thereupon curing of the thus obtained molded or pressed bodies. If fixing of the magnetic bodies in the plastic condition is not desired, the rod-shaped magnetic bodies can also be made by composing separate semi-cylindrical troughs, for enclosing the conductor. The rod-shaped magnetic bodies can advantageously be assembled by glueing the semi-cylindrical troughs, together with the conductor, to form one body.

The invention is now in detail explained with the aid of the accompanying drawings, wherein.

Figure 1:
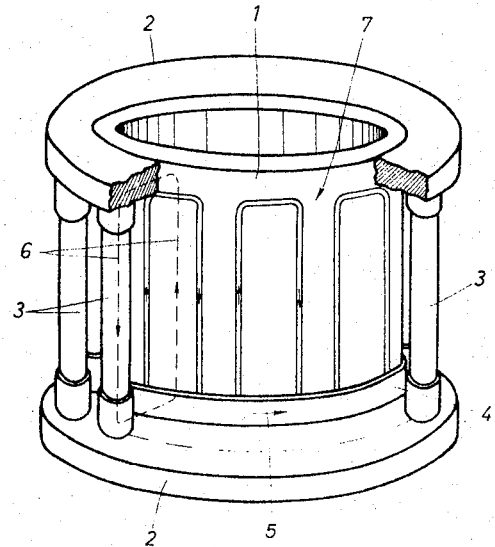
FIG. 1 shows a relay with a plurality of reed-contacts and a cylindrical magnet according to one aspect of the invention.

The relay according to FIG. 1 consists of a cylindrical magnet 1 with flange-type pole pieces 2 on either end, between which poles along the circumference of the cylinder reed-type contacts 3 are arranged in parallel to the magnet's axis. The magnet 1 bears a coaxial cylindrical winding 4 through which current flows in the direction of the arrow 5, for example. The current produces via the cylindrical body, the pole pieces 2 and the armature contacts 3, a useful magnetic flux 6. The magnet 1 may be for example, a permanent magnet for which the magnetic flux 6 represents a stable magnetizing direction. This magnetic flux can keep the armature contacts 3 in the closed condition, even if the exciting current in the winding 4 has ceased. To open the contacts, the axially directed magnetic flux within the magnet 1 should be switched then in a direction perpendicular to the axis of the cylinder. In conjunction herewith it is in principle meaningless, whether the axially directed magnetic flux is capable of holding the contact armatures, or of causing pulling up of said contact armatures again. The same applies for the stability of the axial respectively radial or circular direction of magnetization. But of importance is the winding 7 progressing over the circumference of the cylinder like a meander, in order to suppress the axial direction of magnetization.

Figure 2:
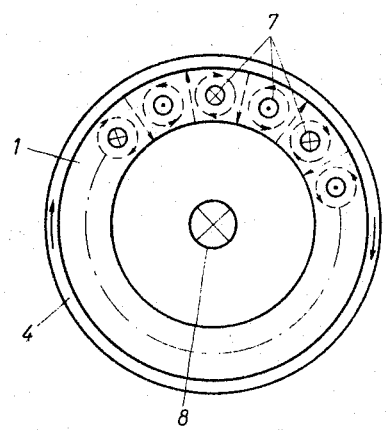
FIG. 2 shows a cylindrical magnet with all around embedded meander winding.

According to FIG. 2 the meander winding 7 within the cylindrical winding 4, generating the axially directed magnetic flux 8, is embedded completely in the magnet 1. Due to the all rounded embedding each individual conductor of the winding 7 is surrounded by a circular magnetic flux. Considering the arrows of the flux direction for the individual loop sides succeeding sections result for the internal and external circumference of the cylinder with always an opposite tangential magnetization direction. Therefore, no circular total flux can be built up in the cylinder. The space between adjacent loop sides of the flux portions, generated by both conductors, have the same sense, but are directed in the opposite direction from loop to loop. Such a magnet is therefore generally suitable to have an axial direction of the useful flux and a perpendicular direction of the non-operative flux compared with the useful flux.

Figure 3:
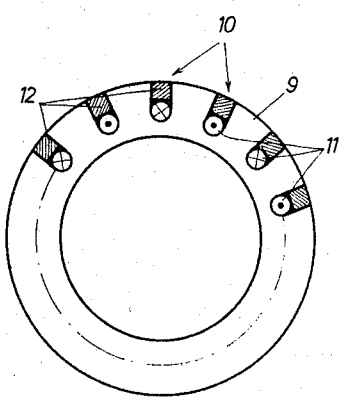
FIG. 3 shows another construction of the magnet according to FIG. 2.

For magnets of the latter type, the embedding of the meander-shaped winding can be made according to FIG. 3. The cylinder core 9 of the magnet is provided on its outside with an open, meander-shaped recess 10 into which the conductor lead 11 is inserted, fitting into the meander shape. The recess 10 is thereupon closed by inserting another meander-shaped lead 12 of a magnetizable material.

Figure 6:
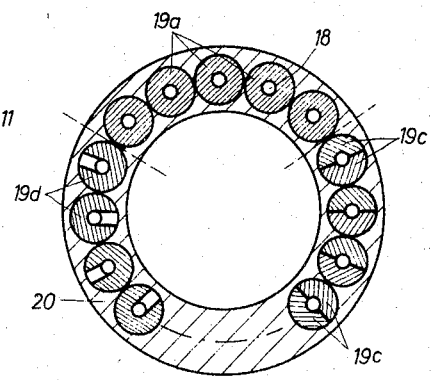
FIG. 6 shows the finished magnet according to FIG. 5 with rod-shaped magnetic bodies of different construction in cross-section.
Figure 4:
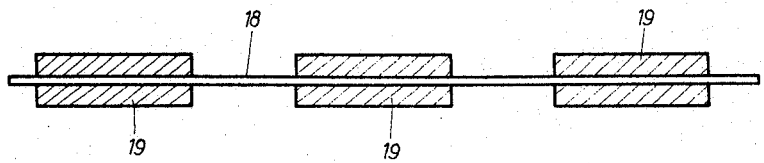
FIG. 4 shows the construction of a cylindrical magnet according to the invention, having a straight conductor and applied rod-shaped magnetic bodies.
Figure 5:
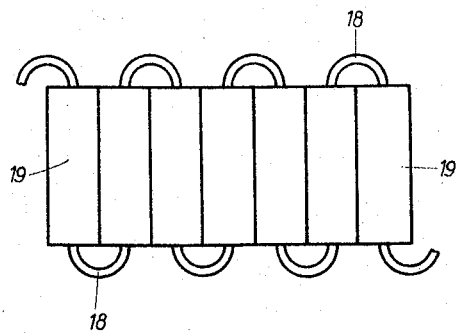
FIG. 5 shows the conductor according to FIG. 4 with the magnetic bodies, having the shape of a meander.

When manufacturing a magnet with exciter winding machine-cutting work processes afterwards as well as an arrangement of intricate recesses can be avoided. An advantageous production method according to the invention is a straight conductor 18 (FIG. 4) which is surrounded in sections with rod-shaped magnetic bodies 19. The conductor is then bent meander-shaped, as shown in FIG. 5, whereby the magnetic bodies 19 touch each other on their longitudinal sides. By this measure at first a stripe-type magnetic body is obtained at the front sides of which the arched meander-shaped sections protrude. Thereupon the strip-type magnetic body is brought into a cylindrical from as shown in FIG. 6 and embedded into a suitable compound mastic as supporting body 20. As may be gathered from FIG. 6, showing the different sections of the cylindrical core, the magnetic bodies 19 can surround the conductor 18 as homogenous molded bodies 19a, consisting of two trough-shaped cylinders 19c, assembled by glueing or made as cylindrical bodies, slotted on one side as indicated by 19d.

While the principles of the invention have between described above in connection with specific methods, apparatus and applications, it is to be understood that this description is made only by way of example and not as a limitation on the scope of the invention.

What is claimed is:

1. A cylindrical magnet having a cylindrical core comprising:
   a first winding wrapped about said cylindrical core in a direction coaxial therewith,
   a second winding having a plurality of parts placed parallel to and along the surface of said cylindrical core;
   said first winding consisting of at least one conductive loop fixed to the cylindrical core;
   said conductive loop, in response to appropriate signals, generating a magnetic flux;
   said magnetic flux having a configuration such that a cross section thereof displays an arrangement essentially like an imaginary cylindrical hollow surface concentrically provided within the magnet.

2. A cylindrical magnet substantially as claimed in claim 1, in which the second winding comprises:
   several conductor loops connected in series and arranged side-by-side along the circumference of the cylindrical core.

3. A cylindrical magnet substantially as claimed in claim 2, in which:
   the cylindrical core has a meander-shaped recess along its surface to accommodate the conductor loops.

4. A cylindrical magnet substantially as claimed in claim 3, in which:
   the meander-shaped recess along the surface of the cylindrical core has a depth exceeding the diameter of the conductor loops; and
   the recess is filled by a magnetic body matching the meander-shape.

5. A cylindrical magnet substantially as claimed in claim 3, in which:
   the conductor loops include straight sections in the longitudinal direction of the cylinder; and only the straight sections of the loops are in close proximity to the cylindrical core to provide a good magnetic circuit with the cylindrical core.

6. A cylindrical magnet, comprising:
   a cylindrical core made up of a plurality of rod-shaped magnetic bodies arranged side-by-side to form a cylinder;
   said cylinder having a longitudinal aperture accommodating a conductive loop;
   said conductive loop, in response to appropriate potentials, generating a magnetic flux;
   said magnetic flux having a configuration such that a cross section thereof displays an arrangement essentially like an imaginary cylindrical hollow surface concentrically provided within the magnet.

7. A cylindrical magnet substantially as claimed in claim 6, in which:
   the rod-shaped magnetic bodies are formed from a long conductor bent to enable sections of the conductor to fit side-by-side.

8. A cylindrical magnet substantially as claimed in claim 6, in which:
   the rod-shaped magnetic bodies consist of a conductor bent in desired shape and encapsulated in a magnetic compound.

9. A cylindrical magnet substantially as claimed in claim 3, in which:
   the meander shaped recess on the cylindrical core is replaced by a series of semi-cylindrical troughs fastened along the face of the cylindrical core.

10. A cylindrical magnet substantially as claimed in claim 9, in which:
the semi-cylindrical troughs are held on the face of the cylindrical core by suitable glue.

References Cited by the Examiner

UNITED STATES PATENTS

| | | | |
|---|---|---|---|
| 2,320,632 | 6/1943 | McMaster | 29—155.59 |
| 2,432,819 | 12/1947 | Schumacker | 29—155.59 |
| 2,728,880 | 12/1955 | Ashworth | 317—172 |
| 2,898,527 | 8/1959 | Kunzmann | 317—172 |
| 2,992,306 | 7/1961 | Feiner. | |

OTHER REFERENCES

Klepzig Fachberichte, Germany, July 1963, p. 209–213.

BERNARD A. GILHEANY, *Primary Examiner.*

G. HARRIS, JR., *Assistant Examiner.*